(12) United States Patent
Fukuoka et al.

(10) Patent No.: US 10,443,552 B2
(45) Date of Patent: Oct. 15, 2019

(54) FUEL SUPPLY DEVICE

(71) Applicants: DENSO CORPORATION, Kariya, Aichi-pref. (JP); KYOSAN DENKI CO., LTD., Koga, Ibaraki-pref. (JP)

(72) Inventors: Shingo Fukuoka, Kariya (JP); Kiyoshi Nagata, Kariya (JP); Norihiro Hayashi, Kariya (JP); Katsuhisa Yamada, Koga (JP)

(73) Assignees: DENSO CORPORATION, Kariya (JP); KYOSAN DENKI CO., LTD., Koga (JP)

( * ) Notice: Subject to any disclaimer, the term of this patent is extended or adjusted under 35 U.S.C. 154(b) by 0 days.

(21) Appl. No.: 15/774,060

(22) PCT Filed: Nov. 4, 2016

(86) PCT No.: PCT/JP2016/082743
§ 371 (c)(1),
(2) Date: May 7, 2018

(87) PCT Pub. No.: WO2017/082156
PCT Pub. Date: May 18, 2017

(65) Prior Publication Data
US 2018/0328323 A1 Nov. 15, 2018

(30) Foreign Application Priority Data
Nov. 13, 2015 (JP) ................................. 2015-223332

(51) Int. Cl.
*F02M 37/10* (2006.01)
*F02M 37/22* (2019.01)
(Continued)

(52) U.S. Cl.
CPC ......... *F02M 37/0052* (2013.01); *B01D 29/11* (2013.01); *B01D 35/26* (2013.01);
(Continued)

(58) Field of Classification Search
CPC .... F02M 37/50; F02M 37/0052; F02M 37/10; F02M 37/00; F02M 37/007; F02M 37/22;
(Continued)

(56) References Cited

U.S. PATENT DOCUMENTS

2005/0274361 A1* 12/2005 Ikeya .................. B01D 35/027
123/457
2011/0139278 A1 6/2011 Kawajiri et al.
2011/0192774 A1 8/2011 Ogose

FOREIGN PATENT DOCUMENTS

JP     8-261088     10/1996
JP     8-277759     10/1996
(Continued)

*Primary Examiner* — Terry K Cecil
(74) *Attorney, Agent, or Firm* — Nixon & Vanderhye PC

(57) ABSTRACT

A fuel supply device includes a pump unit that sucks stored fuel in a fuel tank from a suction port and discharges the fuel to an outside of the fuel tank. A pressure regulating valve performs pressure regulation of fuel discharged from the pump unit. The pressure regulating valve includes a return port having an opening facing in a separating direction away from the suction port, and returns surplus fuel generated by the pressure regulation from the return port into the fuel tank. A suction filter encloses an internal space where the suction port is open, and filters the stored fuel entering the internal space. The suction filter includes an expansion part to which the internal space is extended, and the expansion part is on a side of the return port that faces in the separating direction.

5 Claims, 10 Drawing Sheets

(51) Int. Cl.
  *F02M 37/50* (2019.01)
  *B01D 35/26* (2006.01)
  *F02M 37/00* (2006.01)
  *B01D 29/11* (2006.01)
  *B60K 15/03* (2006.01)
  *G01F 23/38* (2006.01)

(52) U.S. Cl.
  CPC ............ *B60K 15/03* (2013.01); *F02M 37/00* (2013.01); *F02M 37/007* (2013.01); *F02M 37/10* (2013.01); *F02M 37/22* (2013.01); *F02M 37/50* (2019.01); *G01F 23/38* (2013.01); *B01D 2201/16* (2013.01); *B60K 2015/03217* (2013.01)

(58) Field of Classification Search
  CPC .... B01D 2201/16; B01D 29/11; B01D 35/26; B60K 15/03; B60K 2015/03217; G01F 23/38
  See application file for complete search history.

(56) References Cited

FOREIGN PATENT DOCUMENTS

| | | |
|---|---|---|
| JP | 2011-122563 | 6/2011 |
| JP | 2011-153605 | 8/2011 |
| JP | 2011-185112 | 9/2011 |
| JP | 2012-67736 | 4/2012 |

\* cited by examiner

FUEL SUPPLY DEVICE

CROSS REFERENCE TO RELATED APPLICATION

This application is the U.S. national phase of International Application No. PCT/JP2016/082743 filed Nov. 4, 2016, which designated the U.S. and claims priority to Japanese Patent Application No. 2015-223332 filed on Nov. 13, 2015, the entire contents of each of which are hereby incorporated by reference.

TECHNICAL FIELD

The present disclosure relates to a fuel supply device that supplies stored fuel inside a fuel tank of a vehicle to the outside of the fuel tank.

BACKGROUND ART

Conventionally, there has been widely known a fuel supply device that discharges stored fuel sucked into a suction port toward the outside of a fuel tank by a pump unit inside the fuel tank. A device disclosed in Patent Literature 1, which is such a fuel supply device, is provided with a suction filter so as to filter stored fuel and suck the filtered fuel into a suction port of a pump unit inside a fuel tank.

Specifically, in the device disclosed in Patent Literature 1, the suction filter surrounds an internal space where the suction port is open. According to the suction filter as described above, the stored fuel passing toward the internal space is filtered and sucked into the suction port.

PRIOR ART LITERATURE

Patent Literature

Patent Literature 1: JP 2011-122563 A

SUMMARY

The suction filter of the device disclosed in Patent Literature 1 includes an expansion part to which the internal space is extended utilizing an empty space inside the fuel tank, and the expansion part is biasedly located on a side of the suction port of the pump unit that faces in a separating direction away from the suction port. Thus, when a liquid surface is tilted by unevenness in the stored fuel inside the fuel tank, for example, during cornering of a vehicle, and the liquid surface is separating from the suction filter on the side of the suction port that faces in the separating direction, the fuel is likely to decrease on the side of the suction port facing in the separating direction where the expansion part is located in the internal space. In this case, air corresponding to an amount of the decreased fuel enters the internal space through the expansion part. The air may be sucked into the suction port, and the discharge performance of the pump unit may be disadvantageously varied.

The present disclosure has been made in view of the points described above, and an object thereof is to provide a fuel supply device that stabilizes a discharge performance of a pump unit.

According to a first aspect of the present disclosure, a fuel supply device is for supply of stored fuel in a fuel tank of a vehicle to an outside of the fuel tank. The fuel supply device includes a pump unit, a pressure regulating valve and a suction filter. The pump unit is disposed in the fuel tank and configured to suck the stored fuel from a suction port and discharge the fuel toward the outside of the fuel tank. The pressure regulating valve is disposed in the fuel tank and configured to perform pressure regulation of the fuel discharged from the pump unit. The pressure regulating valve includes a return port having an opening facing in a separating direction away from the suction port, and the pressure regulating valve is configured to return surplus fuel generated by the pressure regulation into the fuel tank through the return port. The suction filter is disposed in the fuel tank and enclosing an internal space where the suction port is open, and the suction filter is configured to filter the stored fuel passing through the suction filter toward the internal space to be sucked into the suction port. The suction filter includes an expansion part to which the internal space is extended, and the expansion part is on a side of the return port that faces in the separating direction.

According to the above, the pressure regulating valve performs the pressure regulation of discharged fuel from the pump unit and returns surplus fuel generated by the pressure regulation into the fuel tank through the return port which has the opening facing in the separating direction away from the suction port of the pump unit (hereinafter, merely referred to as the "separating direction"). Thus, in the suction filter, the expansion part to which the internal space is extended is located on the side of the return port facing the separating direction where the return port is open. Accordingly, the fuel returned from the return port passes through the expansion part and enters the internal space on the side of the return port facing in the separating direction even when a liquid surface is tilted by unevenness in the stored fuel inside the fuel tank, the liquid surface is separating from the suction filter on the side facing the separating direction, and the fuel in the internal space thus decreases on the side facing the separating direction. As a result, it is possible to reduce the entry of air corresponding to an amount of the decreased fuel into the internal space through the expansion part. Thus, it is possible to reduce air suction into the suction port and to stabilize the discharge performance of the pump unit.

The internal space may be extended by the expansion part projecting upward on the side of the return port that faces in the separating direction.

According to the above, under the condition where the liquid surface is tilted by unevenness in the stored fuel, the fuel returned from the return port can reliably arrive, by a gravity action, at the expansion part projecting upward on the side of the return port that faces in the separating direction. Accordingly, even when the liquid surface is tilted by the unevenness in the stored fuel and is separating from the suction filter on the side of the suction port facing the separating direction, and the fuel in the internal space thus decreases on the side of the suction port facing in the separating direction, an amount of the decreased fuel can be compensated by the fuel returned from the return port as soon as possible. Thus, it is possible to enhance the effect of reducing air suction into the suction port, and it is possible to improve the stability of the discharge performance in the pump unit.

DESCRIPTION OF EMBODIMENTS

Hereinafter, an embodiment of the present disclosure will be described with reference to the drawings.

Figure 1:
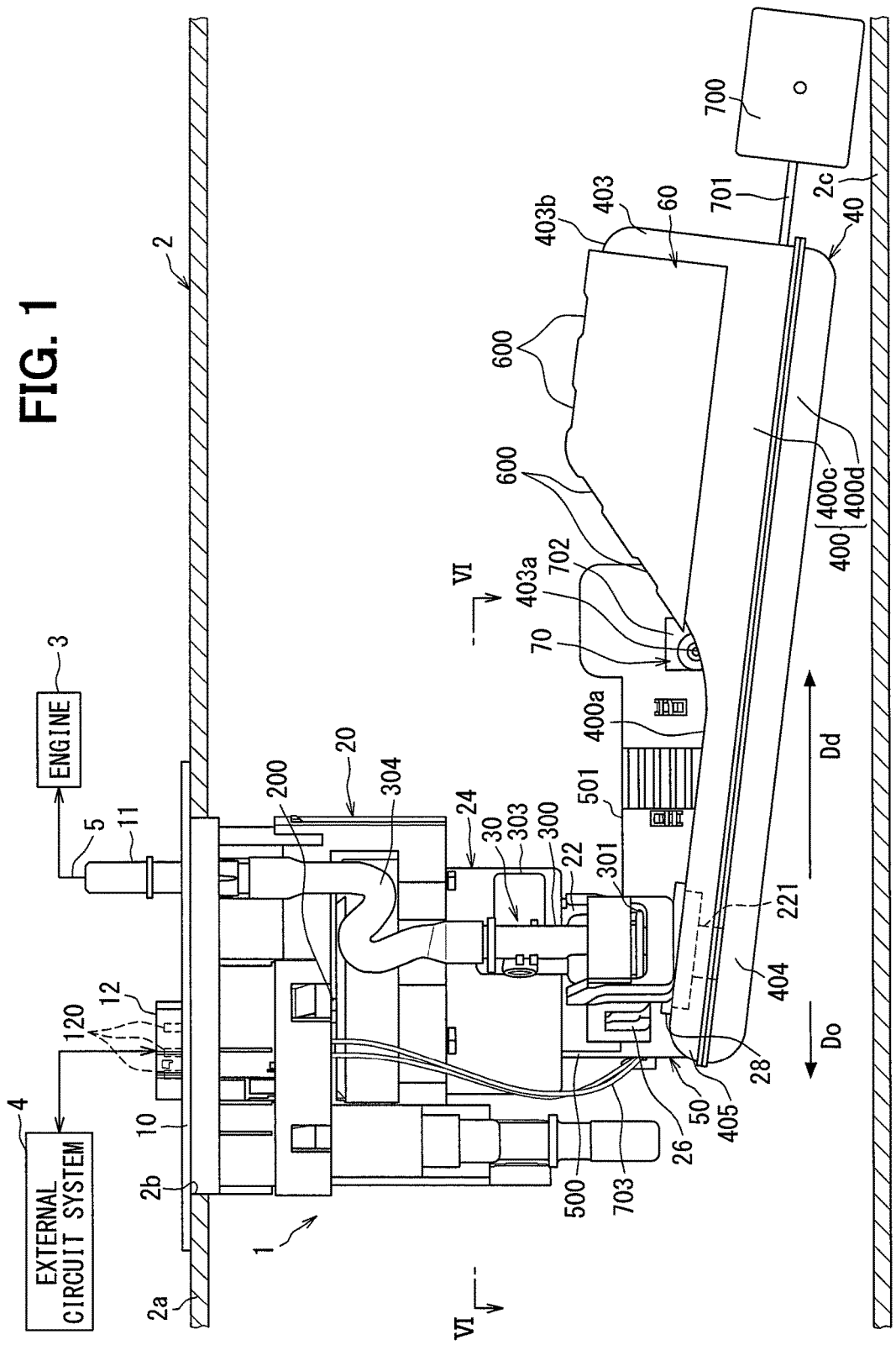
FIG. 1 is a front view of a fuel supply device according to an embodiment of the present disclosure.
Figure 2:
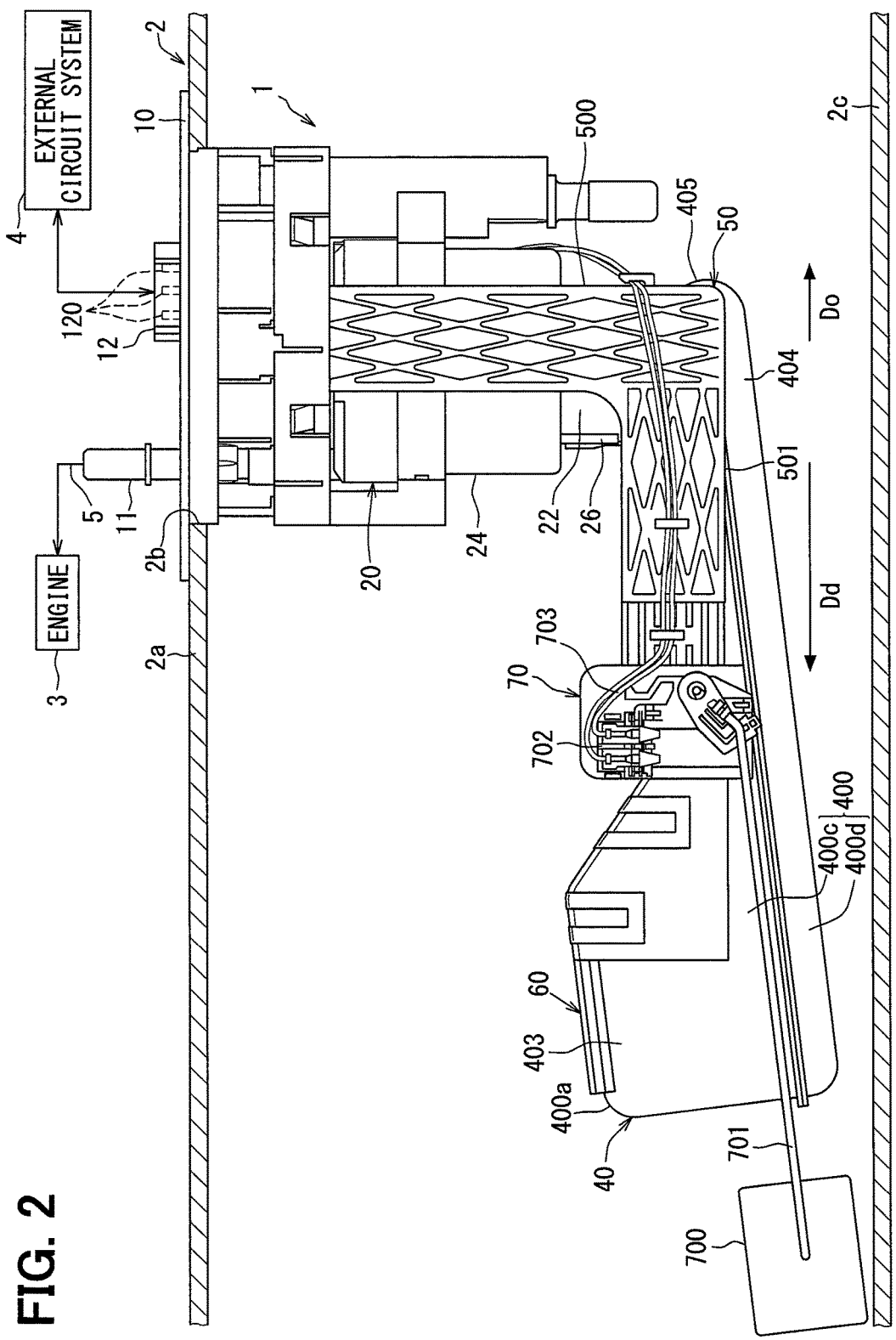
FIG. 2 is a rear view of the fuel supply device according to the embodiment.

As illustrated in FIGS. 1 and 2, a fuel supply device 1 according to an embodiment of the present disclosure is mounted on a fuel tank 2 of a vehicle. The device 1 supplies stored fuel inside the fuel tank 2 to an internal combustion engine 3 which is located outside the fuel tank 2. The fuel tank 2 is made of metal and formed in a hollow shape to store the fuel. The internal combustion engine 3, which is a fuel supply destination from the device 1, may be a gasoline engine or a diesel engine. An up-down direction and a lateral direction (that is, a right-left direction) in FIGS. 1 and 2 which illustrate a mounted state of the device 1 on the fuel tank 2 substantially coincide with a vertical direction and a horizontal direction of the vehicle on a horizontal plane, respectively.

Figure 3:
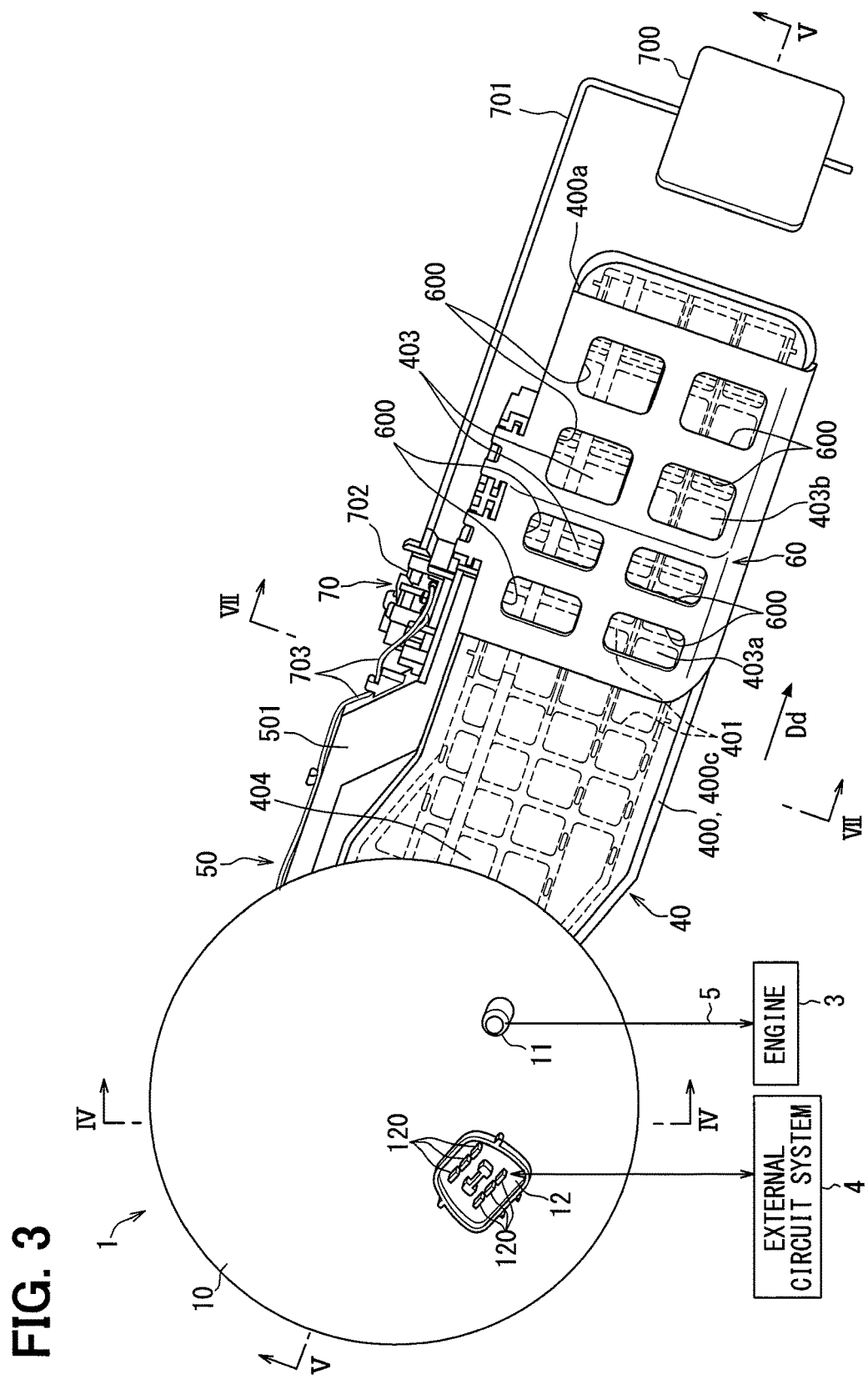
FIG. 3 is a top view of the fuel supply device according to the embodiment.

First, the entire structure of the device 1 will be described. As illustrated in FIGS. 1 to 3, the device 1 is provided with a lid 10, a pump unit 20, a pressure regulating valve 30, a suction filter 40, an L-shaped holder 50, a protection cover 60, and a liquid level detection unit 70.

The lid 10 is made of a resin and formed in an inverted cylindrical cup shape with an outer flange. The lid 10 is disposed with the axial direction thereof aligned with the up-down direction. As illustrated in FIGS. 1 and 2, the lid 10 is attached to a top plate 2a which forms the top end of the fuel tank 2. A through hole 2b having a cylindrical hole shape penetrates the top plate 2a. The lid 10 closes the through hole 2b. The lid 10 includes a fuel supply pipe 11 and an electric connector 12 which are integrated with the lid 10.

The fuel supply pipe 11 communicates with the pump unit 20 inside the fuel tank 2. In addition, as illustrated in FIGS. 1 to 3, the fuel supply pipe 11 communicates with a fuel path 5 to the internal combustion engine 3 outside the fuel tank 2. The fuel supply pipe 11 having such a communication form discharges the stored fuel inside the fuel tank 2 toward the internal combustion engine 3 which is located outside the fuel tank 2.

The electric connector 12 encloses a plurality of metal terminals 120. Each of the metal terminals 120 is electrically connected to either a fuel pump 22 or the liquid level detection unit 70 inside the fuel tank 2. In addition, the metal terminal 120 is electrically connected to an external circuit system 4 such as an ECU outside the fuel tank 2. With such an electric connection, the external circuit system 4 receives a detection signal output from the liquid level detection unit 70 while outputting a control signal which controls the driving of the fuel pump 22 to detect a liquid level of the stored fuel inside the fuel tank 2.

As illustrated in FIGS. 1 and 2, the pump unit 20 is disposed inside the fuel tank 2 and separated upward from a bottom plate 2c of the fuel tank 2. The pump unit 20 includes the fuel pump 22, a fuel filter 24, a pump retainer 26, and a fuel guide 28.

Figure 4:
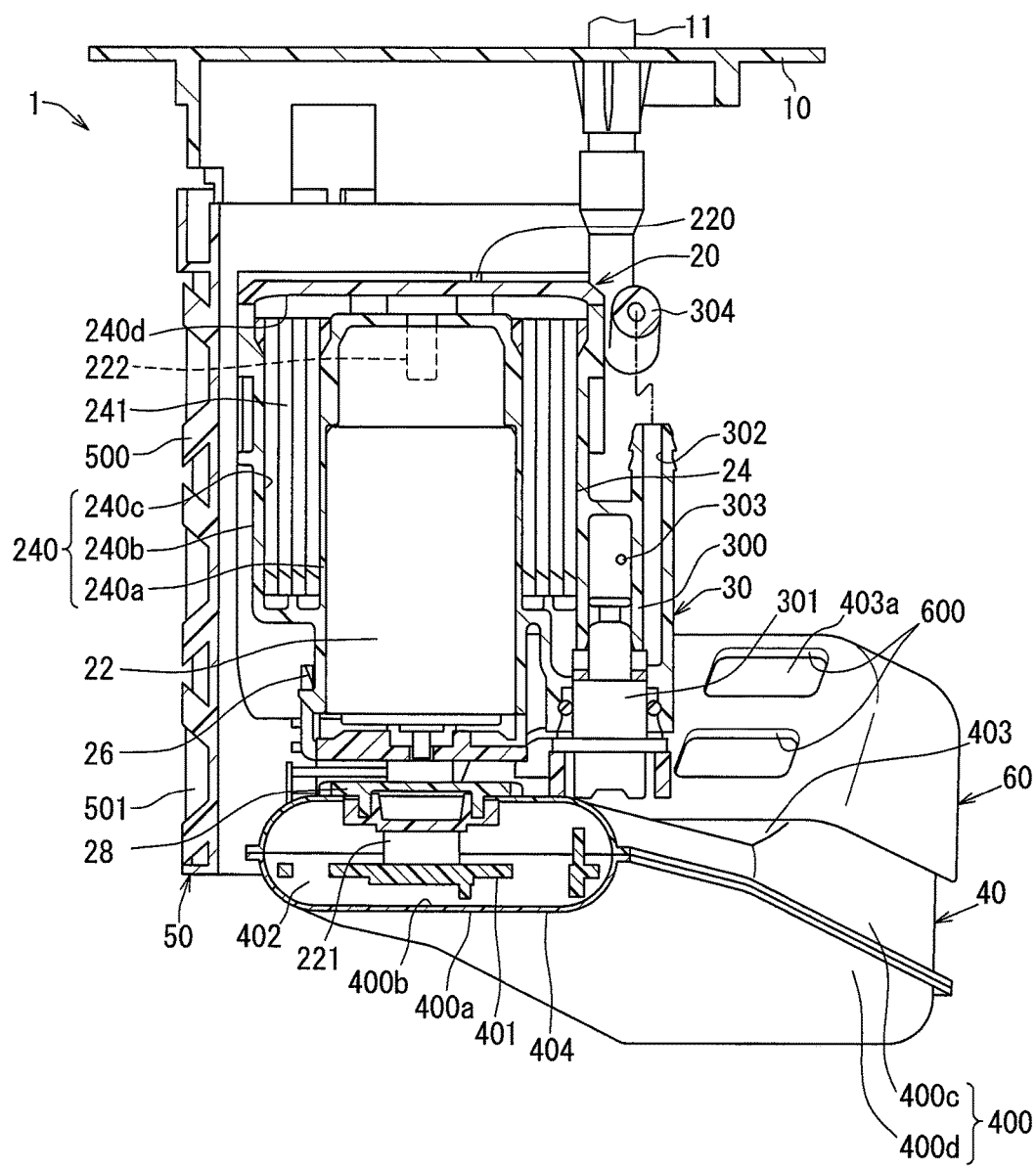
FIG. 4 is a sectional view taken along line IV-IV of FIG. 3.

As illustrated in FIGS. 1 and 4, the fuel pump 22 is an electric pump such as a vane pump or a trochoid pump. The fuel pump 22 is formed in a cylindrical shape as a whole and positioned with the axial direction thereof aligned with the up-down direction. The fuel pump 22 is electrically connected to each of the metal terminals 120 through a flexible wiring line 220 which is freely bendable. With the electric connection, the fuel pump 22 is driven in accordance with the control signal from the external circuit system 4.

Figure 5:
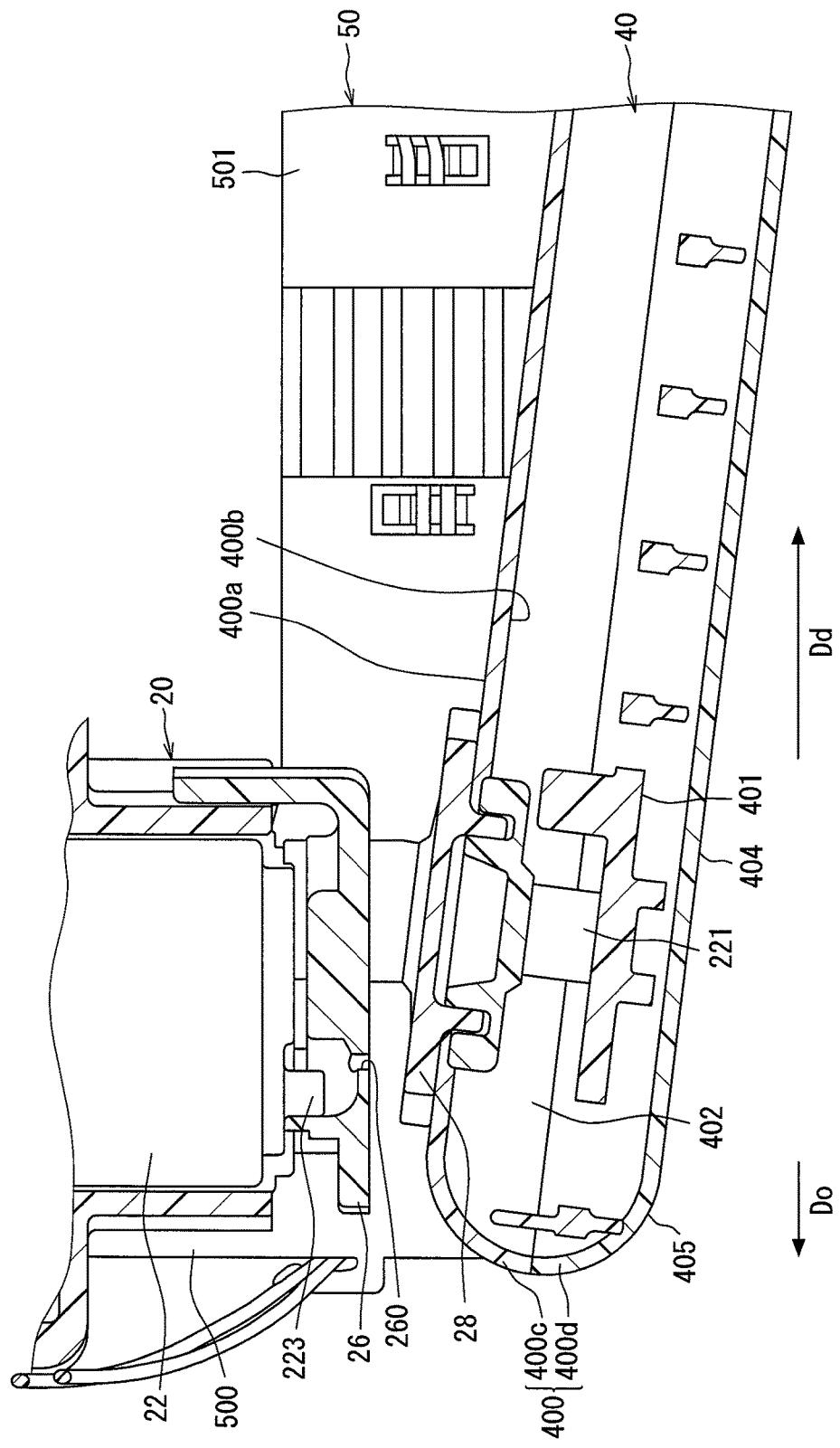
FIG. 5 is a sectional view taken along line V-V of FIG. 3.

As illustrated in FIGS. 1, 4, and 5, the fuel pump 22 includes a suction port 221, a pump side discharge port 222, and a pump side outlet hole 223. The suction port 221 is formed in a cylindrical shape open downward so as to communicate with the suction filter 40. The pump side discharge port 222 is formed in a cylindrical shape open upward as illustrated in FIG. 4 so as to communicate with the fuel filter 24. The fuel pump 22 having such a communication form pressurizes, inside thereof, the stored fuel sucked from the inside of the fuel tank 2 through the suction filter 40 and discharges the pressurized fuel to the fuel filter 24 which is located outside through the pump side discharge port 222. At this time, vapor is generated with the pressurization of the sucked fuel inside the fuel pump 22 and mixed into the sucked fuel. The fuel pump 22 uses the sucked fuel leaking to the pump side outlet hole 223 having a cylindrical hole shape as illustrated in FIG. 5 to discharge the vapor into the fuel tank 2 which is located outside.

As illustrated in FIG. 4, the fuel filter 24 includes a filter case 240 and a filter element 241 which are combined together.

The filter case 240 is made of a resin and formed in a double cylindrical shape. The filter case 240 is positioned with the axial direction thereof aligned with the up-down direction. The filter case 240 includes an inner cylinder 240a which coaxially surrounds the outer peripheral side of the fuel pump 22. The filter case 240 includes a communication passage 240d in an upper part thereof for allowing a filter space 240c between the inner cylinder 240a and an outer cylinder 240b to communicate with the pump side discharge port 222. The communication passage 240d guides the fuel discharged from the pump side discharge port 222 to the filter space 240c.

The filter element 241 is, for example, a filter medium having a honeycomb shape. The filter element 241 is formed in a cylindrical shape and housed in the filter space 240c having an annular shape. The filter element 241 filters the discharged fuel guided from the pump side discharge port 222 to the filter space 240c to remove fine foreign matter from the discharged fuel.

The pump retainer 26 is made of a resin and formed in a cylindrical cup shape. The pump retainer 26 is positioned with the axial direction thereof aligned with the up-down direction. The pump retainer 26 is attached to the lower part of the filter case 240 to hold the fuel pump 22 between the pump retainer 26 and the filter case 240. As illustrated in FIG. 5, the pump retainer 26 includes a retainer side outlet hole 260 having a cylindrical hole shape. The upper end of the retainer side outlet hole 260 communicates with the pump side outlet hole 223. The lower end of the retainer side outlet hole 260 is open inside the fuel tank 2 which is located outside the pump retainer 26. With such a communication form and an opening form, the retainer side outlet hole 260 discharges vapor into the fuel tank 2 together with the sucked fuel to the suction port 221 in cooperation with the pump outlet hole 223.

The fuel guide 28 is made of a resin and formed in an annular plate-like shape. The fuel guide 28 is coaxially attached to the outer peripheral side of the suction port 221. The fuel guide 28 is located between the pump retainer 26 and the suction filter 40 in the up-down direction. The fuel guide 28 is opposed to the lower end of the retainer side outlet hole 260 with a predetermined distance therebetween. With the opposed form, the fuel guide 28 guides the flow of fuel discharged together with vapor through the retainer side outlet hole 260 so as not to directly collide with the suction filter 40.

As illustrated in FIG. 1, the pressure regulating valve 30 is disposed inside the fuel tank 2 and separated upward from the bottom plate 2c of the fuel tank 2. The pressure regulating valve 30 includes a valve case 300 and a valve body 301 which are combined together.

As illustrated in FIG. 4, the valve case 300 is made of a resin and formed in a hollow shape. The valve case 300 is integrally molded with the filter case 240. The valve case 300 communicates with the filter space 240c at the side opposite to the communication passage 240d across the filter element 241. The valve case 300 includes as valve side discharge port 302 and a return port 303. The valve side discharge port 302 communicates with the fuel supply pipe 11 through a flexible tube 304 which is freely bendable. With the communication form, the filtered fuel which has been discharged through the pump side discharge port 222 and filtered by the filter element 241 is discharged toward the internal combustion engine 3 through the valve side discharge port 302. The return port 303 has an opening facing the inside of the fuel tank 2 which is located outside the valve case 300.

The valve body 301 is a so-called pressure regulator. The valve body 301 is housed inside the valve case 300. The valve body 301 regulates the pressure of the fuel discharged toward the internal combustion engine 3 through the valve side discharge port 302. At this time, the valve body 301 returns surplus fuel which is generated by the pressure regulation of the discharged fuel into the fuel tank 2 through the return port 303.

As illustrated in FIGS. 1 and 2, the suction filter 40 is disposed inside the fuel tank 2 and separated upward from the bottom plate 2c of the fuel tank 2. The suction filter 40 is attached to the suction port 221. As illustrated in FIGS. 1 to 7, the suction filter 40 includes a filter element 400 and an inner frame 401 which are combined together.

The filter element 400 is formed in a bag shape and includes an outer surface 400a which is exposed inside the fuel tank 2, and an inner surface 400b which encloses an internal space 402. The filter element 400 includes paired filter sheets 400c, 400d whose outer peripheral edges are liquid-tightly joined together. Each of the filter sheets 400c, 400d is made of a material such as a porous resin, a woven fabric, a nonwoven fabric, a resin mesh, or a metal mesh and formed in a soft or hard diaphragm shape. The coarseness of each of the filter sheets 400c, 400d is set larger than the coarseness of the filter element 241 of the fuel filter 24. With the setting, the filter element 400 filters the stored fuel passing through each of the filter sheets 400c, 400d from the inside of the fuel tank 2 toward the internal space 402 to remove relatively large foreign matter in the stored fuel.

As illustrated in FIGS. 3 to 5, and 7, the inner frame 401 is made of a resin and formed in a grid rib-like shape. The inner frame 401 is housed in the internal space 402 of the filter element 400 to hold each of the filter sheets 400c, 400d from the inner side. The suction port 221 liquid-tightly penetrates the upper filter sheet 400c and is coupled to the inner frame 401 so as to maintain an attitude constantly open in the internal space 402. With the maintaining form, the stored fuel inside the fuel tank 2 is filtered by the filter element 400 and then sucked into the suction port 221.

As illustrated in FIGS. 1 and 2, the L-shaped holder 50 is disposed inside the fuel tank 2 and separated upward from the bottom plate 2c of the fuel tank 2. The L-shaped holder 50 is made of a resin and drawn into an L shape. As illustrated in FIGS. 1, 2, 4 and 5, the L-shaped holder 50 includes a first part 500 which extends in the up-down direction and has an upper end held by the lid 10. On the other hand, as illustrated in FIGS. 1 to 5, and 7, the L-shaped holder 50 includes a second part 501 which projects in the lateral direction from the first part 500 and extends along one side part of the suction filter 40.

As illustrated in FIGS. 1 and 2, the protection cover 60 is disposed inside the fuel tank 2. The protection cover 60 is made of a resin and formed in a bent plate-like shape. The protection cover 60 is held by the second part 501 of the L-shaped holder 50 so as to be separated upward from the bottom plate 2c of the fuel tank 2. As illustrated in FIGS. 1 to 4, 6, and 7, the protection cover 60 partially covers an upper part of the suction filter 40 and a side part of the suction filter 40, the side part being located at the side opposite to the L-shaped holder 50. With the covering form, for example, when the device 1 is inserted into the fuel tank 2 through the through hole 2b, the protection cover 60 is capable of protecting the suction filter 40 to prevent breakage of the filter element 400.

As illustrated in FIGS. 1, 3, 4, 6, and 7, the protection cover 60 includes a plurality of exposure windows 600. Each of the exposure windows 600 is open in a rectangular hole shape so as to expose the suction filter inside the fuel tank 2.

As illustrated in FIGS. 1 and 2, the liquid level detection unit 70 is disposed inside the fuel tank 2 and separated upward from the bottom plate 2c of the fuel tank 2. The liquid level detection unit 70 is a so-called sender gauge. The liquid level detection unit 70 includes a float 700, an arm 701, and a detection body 702.

As illustrated in FIGS. 1 to 3, the float 700 is made of a lightweight material such as foamed ebonite and formed in a rectangular pillar shape. The float 700 has a smaller specific gravity than the stored fuel inside the fuel tank 2 so as to be movable up and down by floating on the liquid surface of the stored fuel. The arm 701 is made of metal and formed in a slender rod shape. One end of the arm 701 is coupled to the float 700. The other end of the arm 701 is rotatably supported by the detection body 702. The detection body 702 is attached to the second part 501 of the L-shaped holder 50. The detection body 702, for example, includes a magnetic conversion element such as a Hall element and a permanent magnet which are combined together to sense a rotation position of the arm 701.

With the above structure, the rotation position of the arm 701 is determined in accordance with the up-down position of the float 700 which follows the liquid level inside the fuel tank 2. Thus, the detection body 702 senses the rotation position. The detection body 702 outputs a signal having a voltage level corresponding to the rotation position of the arm 701 as a detection signal indicating the liquid level followed by the up-down position of the float 700. The liquid level detection unit 70 is electrically connected to the metal terminal 120 through a flexible wiring line 703 which is freely bendable. With the electric connection, the liquid level detection unit 70 outputs the detection signal indicating the liquid level to the external circuit system 4.

Next, a detailed structure of the device 1 will be described.

Figure 6:
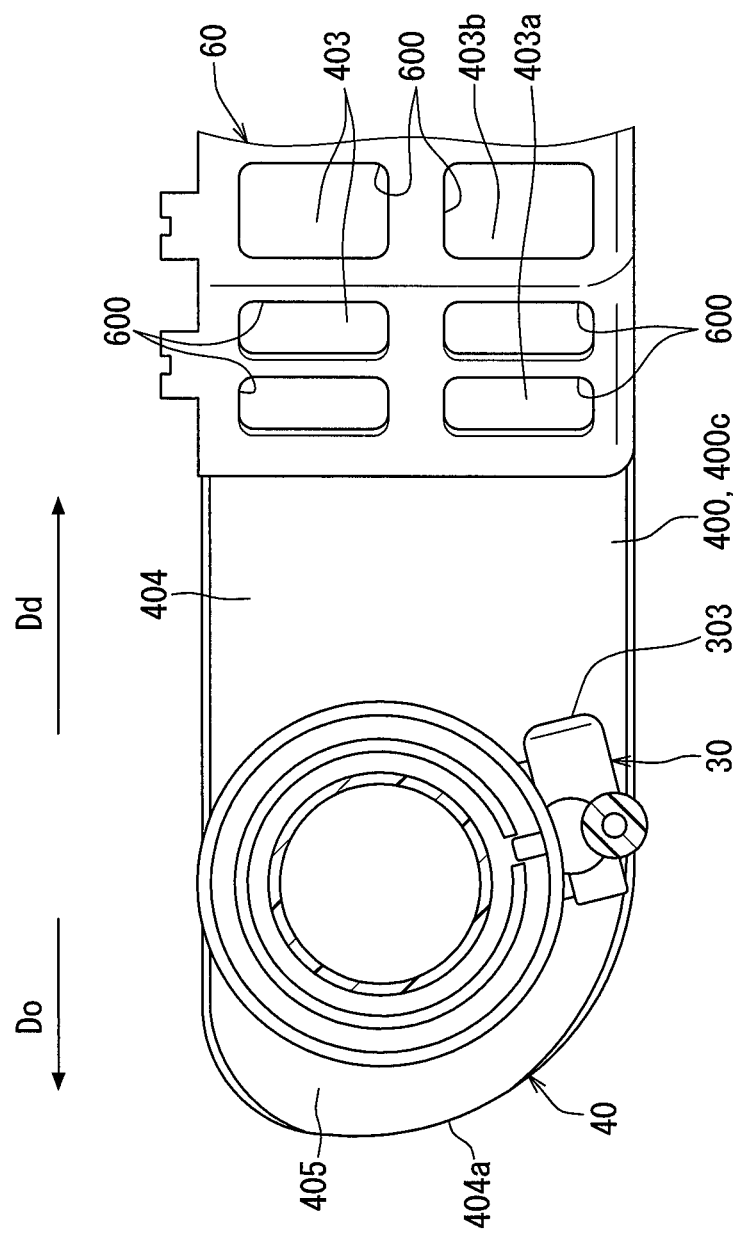
FIG. 6 is a sectional view taken along line VI-VI of FIG. 1.
Figure 7:
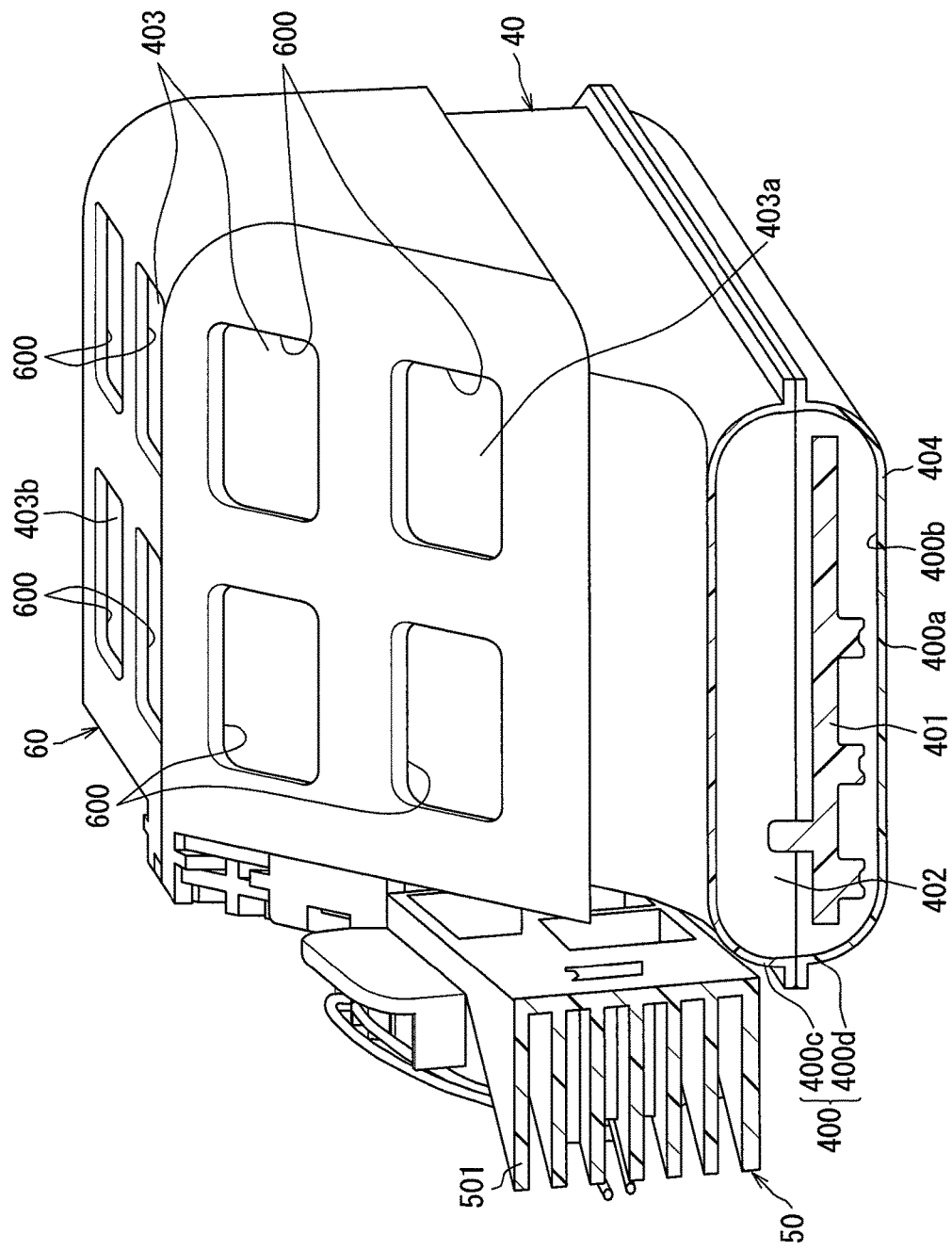
FIG. 7 is a perspective view of a suction filter including a sectional view taken along line VII-VII of FIG. 3.

As illustrated in FIGS. 1 and 6, the return port 303 has an opening facing in a separating direction Dd (that is, the rightward direction in FIGS. 1 and 6) away from the suction port 221 in the lateral direction. As illustrated in FIGS. 1 to 4, 6, and 7, the suction filter 40 includes an expansion part 403 which is biasedly located in the separating direction Dd. The expansion part 403 projects upward relative to a base part 404 where the suction port 221 penetrates the suction filter 40. The projecting form of the expansion part 403 causes the internal space 402 to be extended upward on a side of the return port 303 that faces in the separating direction Dd. As illustrated in FIGS. 1 to 3, the float 700 is movable up and down in a range at least below the return port 303 on a side of the expansion part 403 that faces in the separating direction Dd while the expansion part 403 extends in the separating direction Dd from the base part 404.

As illustrated in FIGS. 1, 3, 4, 6, and 7, the protection cover 60 protects, in particular, the expansion part 403 of the suction filter 40. The expansion part 403 includes a projecting wall 403a which projects obliquely so as to become higher in the separating direction Dd away from the return port 303. The projecting wall 403a is exposed inside the fuel tank 2 through four of the exposure windows 600 which are formed on the protection cover 60 on the separating direction Dd. Meanwhile, the expansion part 403 includes a top wall 403b which faces upward and is located on the side of the return port 303 that faces in the separating direction Dd. The top wall 403b is exposed inside the fuel tank 2 through the other four exposure windows 600 which are formed on the protection cover 60 on the side facing the separating direction Dd.

As illustrated in FIGS. 1, 2, 5, and 6, the suction filter 40 includes an extending part 405 on a side of the suction port 221 that faces in an opposite direction Do which is opposite to the separating direction Dd in the lateral direction. As illustrated in FIG. 5, the extending part 405 extends straight in the opposite direction Do, which is opposite to the separating direction Dd, from the base part 404. The outlet holes 223, 260 and the fuel guide 28 are all located above the extending part 405. Under such a positional configurations, fuel that has been discharged together with vapor through the outlet holes 223, 260 on the side of the suction port 221 facing the opposite direction Do collides with the fuel guide 28 and is guided by the fuel guide 28 so that the fuel can flow in the opposite direction Do. That is, the fuel guide 28 is capable of guiding the fuel discharged together with vapor through the outlet holes 223, 260 in the opposite direction Do, which is opposite to the separating direction Dd.

The action and effect of the device 1 described above will be described below.

Figure 8:
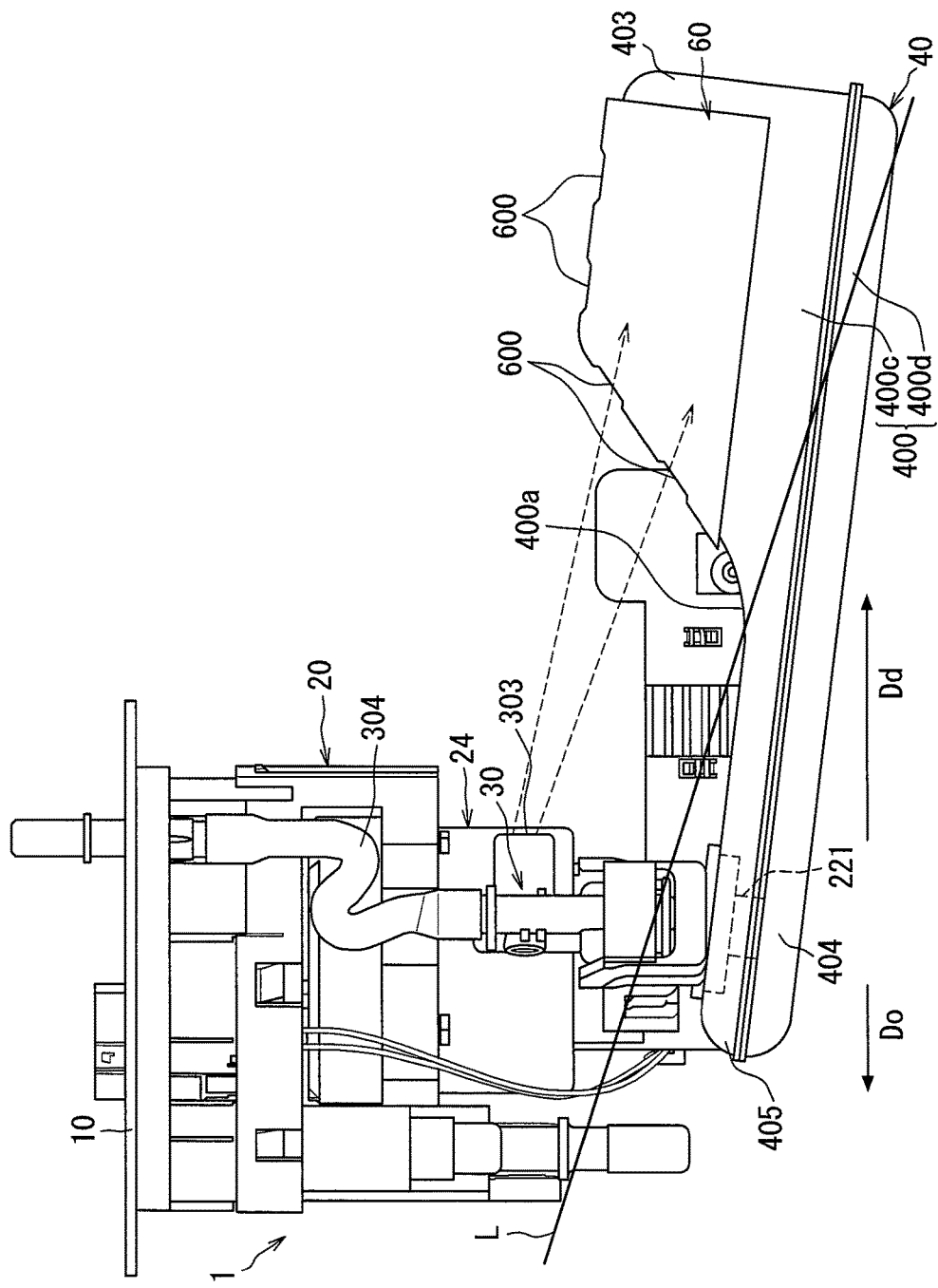
FIG. 8 is a schematic view for describing the action and effect of the fuel supply device according to the embodiment.

According to the device 1, the pressure regulating valve 30 regulates the pressure of discharged fuel from the pump unit 20 and returns surplus fuel generated by the pressure regulation into the fuel tank 2 through the return port 303 which has the opening facing in the separating direction Dd away from the suction port 221 of the pump unit 20. Thus, in the suction filter 40 of the device 1, the expansion part 403 to which the internal space 402 is extended is located on the opening side of the return port 303 that faces in the separating direction Dd. Here, as illustrated in FIG. 8, it is assumed that a liquid surface L tilted by unevenness in the stored fuel inside the fuel tank 2 is separating from the suction filter 40 on the side of the suction port 221 that faces in the separating direction Dd. In this case, even when the fuel in the internal space 402 decreases on the side of the suction port 221 that faces in the separating direction Dd, the fuel returned through the return port 303 passes through the expansion part 403 on the side facing the separating direction Dd and enters the internal space 402 as indicated by broken arrows in FIG. 8. As a result, it is possible to reduce the entry of air corresponding to the decreased fuel into the internal space 402 through the expansion part 403. Thus, it is possible to reduce air suction into the suction port 221 and to stabilize the discharge performance of the pump unit 20.

Further, according to the device 1, under the condition in which the liquid surface L is tilted by unevenness in the stored fuel, as indicated by the broken lines in FIG. 8, the fuel returned through the return port 303 can reliably arrive, by a gravity action, at the expansion part 403 projecting upward on the side of the return port 303 that faces in the separating direction Dd. Accordingly, even when the liquid surface L tilted by the unevenness in the stored fuel inside the fuel tank 2 is separating from the suction filter 40 on the side of the suction port 221 that faces in the separating direction Dd, and the fuel in the internal space 402 thus decreases on the side facing in the separating direction Dd, the decreased fuel can be compensated by the fuel returned through the return port 303 as soon as possible. Thus, it is possible to enhance the effect of reducing air suction into the suction port 221 and to improve the stability of the discharge performance in the pump unit 20.

Further, the protection cover 60 has the exposure windows 600 on a side of the return port 303 that faces in the separating direction Dd in the device 1. The protection cover 60 is capable of exposing the projecting wall 403a which projects upward in the expansion part 403 and protects the expansion part 403. Accordingly, it is possible to enhance the durability of the suction filter 40 and the effect of reducing air suction into the suction port 221, and it is possible to improve the stability of the discharge performance in the pump unit 20.

Figure 9:
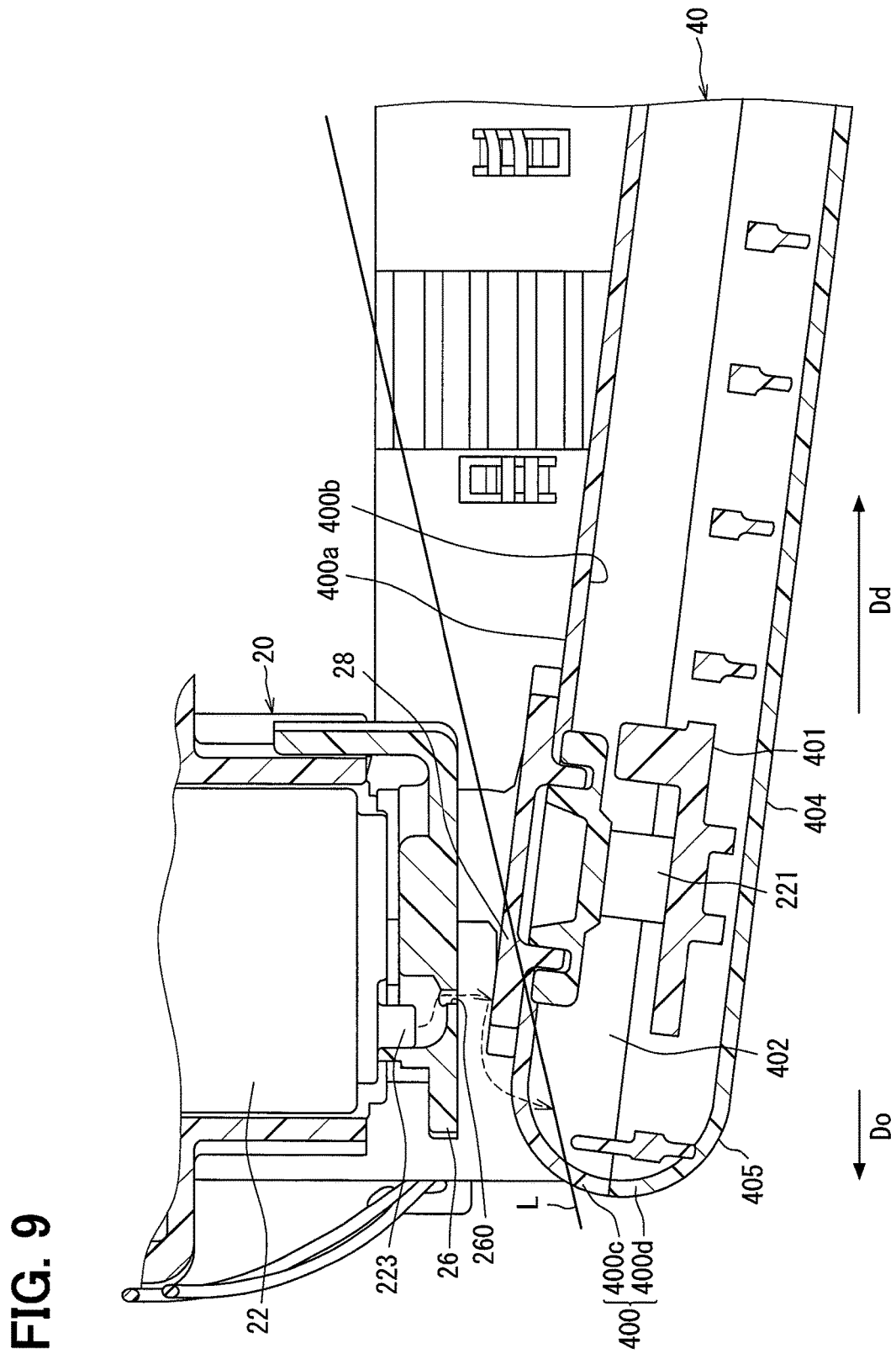
FIG. 9 is a schematic view for describing the action and effect of the fuel supply device according to the embodiment.

In addition, according to the device 1, the outlet holes 223, 260 of the pump unit 20 discharge vapor contained in sucked fuel into the fuel tank 2 with the sucked fuel. On a side of the suction port 221 that faces in the opposite direction Do which is opposite to the separating direction Dd, the extending part 405 of the suction filter 40 has a structure protruding out, and the fuel is discharged together with vapor through the outlet holes 233, 260. Here, as illustrated in FIG. 9, it is assumed that the liquid surface L tilted by unevenness in the stored fuel inside the fuel tank 2 is separating from the suction filter 40 on a side of the suction port 221 that faces in the opposite direction Do. In this case, even when the fuel in the internal space 402 decreases on the side of the suction port 221 that faces in the opposite direction Do, the fuel discharged through the outlet holes 223, 260 passes through the extending part 405 and enters the internal space 402 as indicated by broken arrows in FIG. 9. As a result, it is possible to reduce the entry of air corresponding to the decreased fuel into the internal space 402 through the extending part 405. Thus, it is possible to reduce the suction of air passing through the extending part 405 into the suction port 221, and it is possible to stabilize the discharge performance in the pump unit 20.

Figure 10:
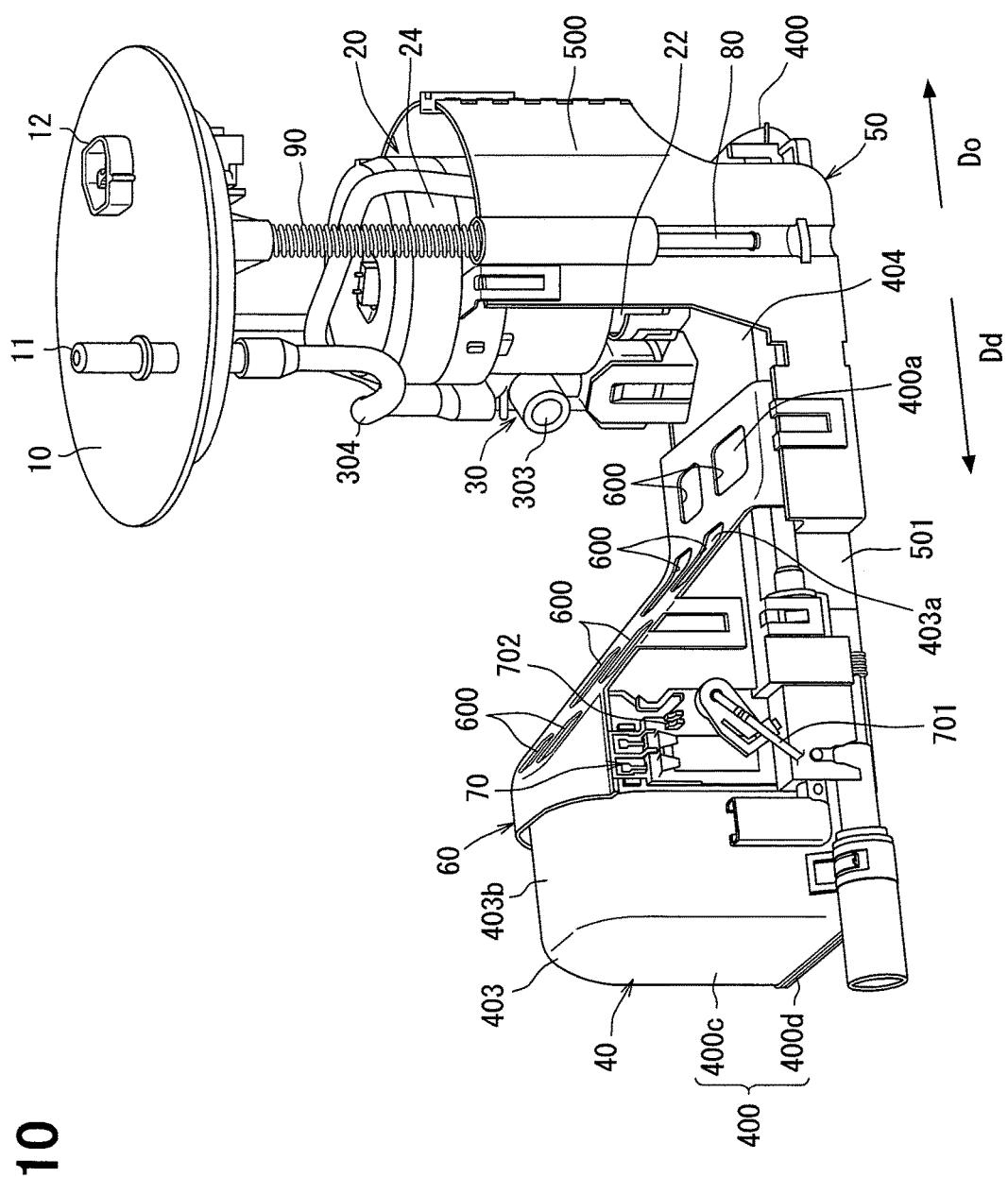
FIG. 10 is a perspective view of a fuel supply device according to a modification of the present disclosure.

In addition, according to the device 1, the fuel discharged together with vapor through the outlet holes 223, 260 is guided away from the suction port 221 along the opposite direction Do opposite to the separating direction Dd by the fuel guide 28 located above the extending part 405 as indicated by broken arrows in FIG. 10. Accordingly, the fuel discharged through the outlet holes 223, 260 can be reliably guided to the side of the suction port 221 that faces in the opposite direction Do, where the fuel in the internal space 402 decreases due to the liquid surface L being tilted by unevenness in the stored fuel inside the fuel tank 2 and separating from the suction filter 40. As a result, air corresponding to the decreased fuel is less likely to enter the internal space 402 through the extending part 405. Thus, it is possible to enhance the effect of reducing air suction into the suction port 221 and to improve the stability of the discharge performance in the pump unit 20.

In addition, according to the device 1, the liquid level detection unit 70 which detects the liquid level of the stored fuel inside the fuel tank 2 outputs a detection signal indicating the liquid level followed by the up-down position of the float 700 which floats on the liquid surface of the stored fuel. The float 700 is movable on a side of the expansion part 403 that faces in the separating direction Dd. Thus, the fuel returned through the return port 303 can easily pass through the expansion part 403 before arrival at the float 700. Accordingly, it is possible to reduce an error in the detection signal caused by fluctuations in the up-down position of the float 700 due to the arrival of the returned fuel. Thus, it is possible to increase the accuracy of detecting the liquid level.

The embodiment of the present disclosure has been described above. However, the present disclosure is not limited to the above embodiment and can be applied to various embodiments within the range of the gist of the present disclosure.

Specifically, in a first modification, the protection cover 60 may not include the exposure windows 600. In a second modification, the device 1 may not include the protection cover 60. In a third modification, at least one of the base part 404 and the extending part 405 of the suction filter 40 may be protected by the protection cover 60 in addition to or instead of the expansion part 403.

In a fourth modification, the outlet holes 223, 260 may be formed on the side of the suction port 221 that faces in the separating direction Dd. In a fifth modification, the pump unit 20 may not include the outlet holes 223, 260. In a sixth modification, the suction filter 40 may not include the extending part 405. In a seventh modification, the pump unit 20 may not include the fuel guide 28.

In an eighth embodiment, the float 700 may be moved in a range closer to the suction port 221 than the expansion part 403 is. In a ninth modification, the device 1 may include a liquid level detection unit 70 that detects the liquid level without using the float 700. In a tenth modification, the device 1 may not include the liquid level detection unit 70.

In an eleventh modification, the projecting direction of the expansion part 403 on the side of the return port 303 that faces in the separating direction Dd may be set to another direction in addition to or instead of the upward direction. In a twelfth embodiment, as illustrated in FIG. 10, the pump unit 20 may be disposed movably up and down with respect to a support pole 80 which is fixed to the lid 10 and press the suction filter 40 against the bottom plate 2c of the fuel tank 2 by a spring 90 located between the lid 10 and the pump unit 20.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A fuel supply device for supply of stored fuel in a fuel tank of a vehicle to an outside of the fuel tank, the fuel supply device comprising:
   a pump unit disposed in the fuel tank and configured to suck the stored fuel from a suction port and discharge the fuel toward the outside of the fuel tank;
   a pressure regulating valve disposed in the fuel tank and configured to perform pressure regulation of the fuel discharged from the pump unit, the pressure regulating valve including a return port having an opening facing in a separating direction, the separating direction being defined as a direction radially away from the suction port when the suction port is viewed in a fuel sucking direction of the suction port, the pressure regulating valve being configured to return surplus fuel generated by the pressure regulation into the fuel tank through the return port; and
   a suction filter disposed in the fuel tank and enclosing an internal space where the suction port is open, the suction filter being configured to filter the stored fuel passing through the suction filter toward the internal space to be sucked into the suction port, the suction filter including an expansion part to which the internal space is extended, the return port opening that faces in the separating direction also faces toward the expansion part, wherein:
   the suction filter includes an extending part to which the internal space is extended for protruding out in an opposite radial direction opposite to the separating direction, the extending part being on a side of the suction port that faces in the opposite radial direction;
   the pump unit includes an outlet hole configured to allow vapor contained in fuel sucked into the suction port to be discharged into the fuel tank with the sucked fuel, the outlet hole being on a side of the pump unit that faces in the opposite radial direction; and
   the pump unit includes a fuel guide configured to guide fuel discharged together with the vapor from the outlet hole to flow in the opposite radial direction.

2. The fuel supply device according to claim 1, wherein the internal space is extended by the expansion part projecting upward on the side of the return port that faces in the separating direction.

3. The fuel supply device according to claim 2, further comprising
   a protection cover disposed in the fuel tank, protecting the expansion part and having an exposure window, the exposure window exposing a protrusion wall of the expansion part protruding upward, the exposure window being on the side of the return port that faces in the separating direction.

4. The fuel supply device according to claim 1, further comprising
   a liquid level detection unit disposed in the fuel tank and configured to detect a liquid level of the stored fuel, the liquid level detection unit including a float configured to movably float on a liquid surface of the stored fuel on a side of the expansion part that faces in the separating direction, the liquid level detection unit being configured to output a detection signal indicating the liquid level corresponding to an up-down position of the float.

5. The fuel supply device according to claim 1, wherein the suction filter includes a first extension part extending from the suction port in the separating direction, and a second extension part extending from the suction port in the opposite radial direction, and
the first extension part includes the expansion part, and the second extension part includes the extending part.

\* \* \* \* \*